United States Patent
Rodemer

(10) Patent No.: US 8,556,020 B2
(45) Date of Patent: Oct. 15, 2013

(54) MOTOR-VEHICLE SEAT BELT WITH BUILT-IN ELECTRONICS

(75) Inventor: Klaus Rodemer, Lautertal (DE)

(73) Assignee: paragon AG, Delbrueck (DE)

( * ) Notice: Subject to any disclaimer, the term of this patent is extended or adjusted under 35 U.S.C. 154(b) by 0 days.

(21) Appl. No.: 13/358,710

(22) Filed: Jan. 26, 2012

(65) Prior Publication Data

US 2013/0193727 A1    Aug. 1, 2013

(30) Foreign Application Priority Data

Jan. 25, 2011    (DE) .................. 10 2011 009 318

(51) Int. Cl.
    *B60K 28/06*      (2006.01)
    *B60R 22/12*      (2006.01)

(52) U.S. Cl.
    USPC ........ 180/272; 280/801.1; 280/808; 297/482; 340/438; 340/457

(58) Field of Classification Search
    USPC ............... 180/268, 270, 271, 272; 280/801.1, 280/808; 297/468, 482; 340/438, 457, 340/457.1, 576
See application file for complete search history.

(56) References Cited

U.S. PATENT DOCUMENTS

| | | | | |
|---|---|---|---|---|
| 5,990,795 A * | 11/1999 | Miller | ........................... | 340/576 |
| 6,002,325 A * | 12/1999 | Conaway | ................... | 340/384.1 |
| 6,337,629 B1 * | 1/2002 | Bader | ........................... | 340/576 |
| 7,213,308 B2 * | 5/2007 | Kobayashi | ...................... | 24/633 |
| 7,576,624 B2 * | 8/2009 | Weston et al. | ................. | 333/20 |
| 8,115,648 B2 * | 2/2012 | Lorenz et al. | ................. | 340/667 |
| 2006/0229785 A1 * | 10/2006 | Baur et al. | ..................... | 701/45 |
| 2007/0182534 A1 * | 8/2007 | Gregory | ..................... | 340/457.1 |
| 2008/0302841 A1 * | 12/2008 | Conforti | ....................... | 224/191 |

FOREIGN PATENT DOCUMENTS

| JP | 02246837 A | * | 10/1990 |
|---|---|---|---|
| JP | 2006076438 A | * | 3/2006 |
| JP | 2006076439 A | * | 3/2006 |

* cited by examiner

*Primary Examiner* — Ruth Ilan
*Assistant Examiner* — Darlene P Condra
(74) *Attorney, Agent, or Firm* — Andrew Wilford

(57) ABSTRACT

This object is attained by the combination of a motor-vehicle safety belt formed as a flexible longitudinally extending band and formed with a longitudinally extending and laterally substantially closed passage with an insert fittable into the passage and comprised of a flexible and elongated support strip and at least one electrical or electronic element usable by a motor-vehicle passenger employing the belt secured to the strip.

10 Claims, 1 Drawing Sheet

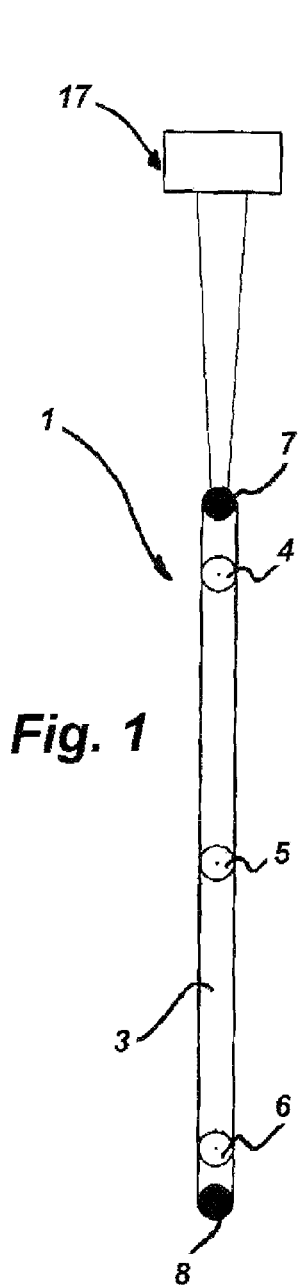
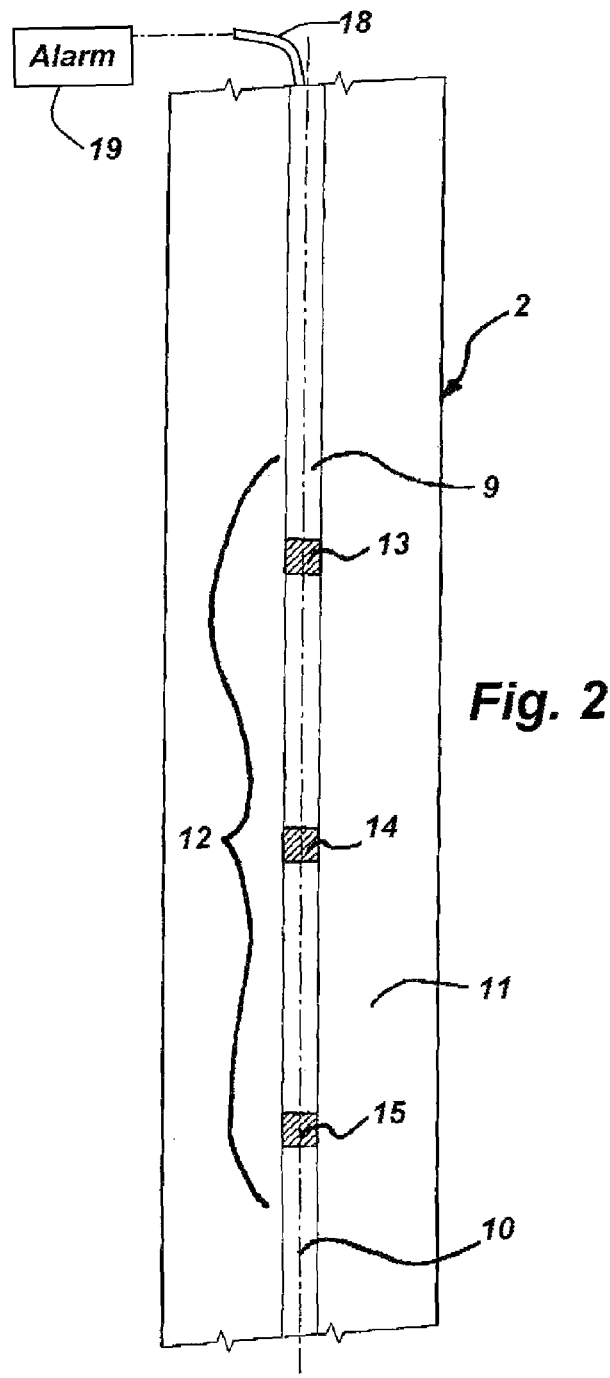
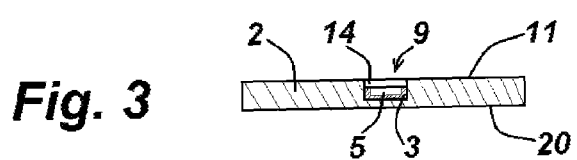

MOTOR-VEHICLE SEAT BELT WITH BUILT-IN ELECTRONICS

FIELD OF THE INVENTION

The present invention relates to a motor-vehicle seat belt. More particularly this invention concerns such a seat belt for use with a vehicular electronic system.

BACKGROUND OF THE INVENTION

A typical motor-vehicle seat of safety belt is a simple web band that has one longitudinal end provided with an anchor fitting by means of which it is permanently attached to the vehicle seat or frame and an opposite longitudinal end with a clip that can be mated with another such clip also secured to the vehicle seat or frame, with some sort of length adjuster provided normally near the free end. Such belts are made of heavy normally woven material with relatively little stretch and have been in use as shoulder belts that pass down from the anchored end across the user's chest to the releasable clip end and as lap belts that extend across the user's lap.

It has been suggested to incorporate some type of sensor or electronics, for instance a microphone, into such a belt. This sensor is coupled to the vehicle's electronics, for instance to a telephone dock or a Bluetooth telephone interface for hands-free telephone use. Thus the quality of communication using a hands-free system of the vehicle can be significantly increased. No such system that is practical, attractive, and inexpensive to manufacture has been made.

OBJECTS OF THE INVENTION

It is therefore an object of the present invention to provide an improved motor-vehicle seat belt with built-in electronics.

Another object is the provision of such an improved motor-vehicle seat belt with built-in electronics that overcomes the above-given disadvantages, in particular that can be produced cheaply yet will provide the electronics or sensor at a location where it is particularly effective and not at all burdensome.

SUMMARY OF THE INVENTION

This object is attained according to the invention by the combination of a motor-vehicle safety belt formed as a flexible longitudinally extending band and formed with a longitudinally extending and laterally substantially closed passage with an insert fittable into the passage and comprised of a flexible and elongated support strip and at least one electrical or electronic element usable by a motor-vehicle passenger employing the belt secured to the strip.

According to the invention, the safety belt can easily be manufactured by a conventional weaving process or the like, where it is not necessary to take into account the later fitting of the safety belt with an electrical or electronic insert. The electrical or electronic insert which is later to be incorporated into the safety belt can likewise be manufactured separately as a whole and therefore with comparatively little technical manufacturing difficulty. To fit the electrical or electronic insert to the safety belt, all that is necessary is to slide the electronic or electronic insert into the passage of the safety belt by a suitable tool, e.g. an insertion device, until it has reached its required installation or operating position.

Advantageously, the passage is approximately centrally positioned in the safety belt.

According to an advantageous embodiment of the safety belt according to the invention, the passage thereof is formed on the front or top side of the safety belt so that the lower face of the safety belt is not changed as a result of the passage. This ensures that no irritation or encumbrance occurs at the contact surface of the safety belt with a person who is protected by the safety belt.

When the electrical or electronic insert has microphones, for example, as sensors, it is advantageous when the passage of the safety belt has at least one region through which sound can pass in that longitudinal portion in which the electrical or electronic insert can be fixed. By associating the region or regions through which sound can pass with the microphones of the electrical or electronic insert, the efficiency of the microphones can be significantly increased, as a result of which increased comfort is achieved when using a hands-free device for example. Manufacturing these regions in the passage of the safety belt through which sound can pass can be achieved with little effort by an appropriate adjustment of the weaving program for the safety belt.

To simplify the handling of the electrical or electronic insert, it is advantageous when sensor and/or actuator elements of the electrical or electronic insert are attached to a common support strip. This support strip can be a flexible printed circuit board or a partially metallized plastic, for example. In this case, the support strip also provides an electrical connection between the individual sensor and/or actuator elements. However, it is also conceivable that the electrical or electronic insert comprises a plurality of modules which are electrically connected to one another. In the simplest case, the appropriate connections can be made by a ribbon cable.

At the same time, the external dimensions of the electrical or electronic insert can be specified so that, on the one hand, the insert can be slid into the passage of the safety belt with comparatively little effort but, on the other, it is also subject to a certain guidance by the inner wall of the passage.

A correct positioning of the electrical or electronic insert on or in the safety belt can be ensured in the long term when the electrical or electronic insert can be fixed in the passage of the safety belt. This fixing can be carried out in any known manner.

In order to guarantee that the electrical or electronic insert is reliably attached at the required installation position within the passage, it is advantageous when anchor regions, by means of which the electrical or electronic insert can be welded in a fixing position within the passage of the safety belt by means of laser welding, are formed on the electrical or electronic insert which can be inserted into the passage of the safety belt. When the electrical or electronic insert is fixed by means of laser welding, laser-transparent surfaces, which are penetrated by the laser beam and impinge on a laser-absorbing anchor region on the integrated electrical or electronic insert, are created at defined points. At this point, the energy of the laser beam is converted into heat. The laser-transparent and the anchor regions can then be bonded together under pressure.

Alternatively, it is possible to mechanically connect the sensor and/or actuator elements attached to the electrical or electronic insert, which can be inserted into the passage, to the belt webbing of the safety belt by means of a cap, as a result of which a rivet or clip solution can effectively be realized. That is to say, the surface of the safety belt is penetrated by a cap or cover, namely above the sensor and/or actuator elements, as a result of which the fixing and a covering are effected simultaneously.

In addition, the cap or caps can be bonded to the belt webbing of the safety belt by means of laser welding or by gluing.

When the electrical or electronic insert, which can be inserted into the passage of the safety belt, comprises a plurality of sensor and/or actuator elements and its electrical connection means are elastically formed in the longitudinal direction of the belt webbing of the safety belt, tolerances and stretching of the belt webbing can be compensated for.

When the safety belt has a sensor device by means of which a stretching of the belt webbing of the safety belt can be detected, measured data of this sensor device can be used in the event of an accident or similar event as a basis of information for limiting or controlling the belt force. In addition, after a mechanical stressing of the belt webbing of the safety belt, this sensor device could provide information relating to a replacement of the belt webbing which may be necessary due to too high a loading or stretching.

If the safety belt has a possible further sensor device, by means of which the vital signs of a motor vehicle occupant, in particular the vehicle driver, e.g. pulse, breathing and suchlike, can be monitored, safety during operation of the motor vehicle can be increased.

The same applies for the case where the safety belt has an active device, e.g. a wake-up device (shaker), which can act on a motor vehicle occupant, in particular on the vehicle driver, in order to warn against an otherwise threatened or imminent dozing-off, for example.

BRIEF DESCRIPTION OF THE DRAWING

The above and other objects, features, and advantages will become more readily apparent from the following description, reference being made to the accompanying drawing in which:

FIG. 1 is a side view of a sensor insert and insertion tool according to the invention;

FIG. 2 is a side view of a belt for use with the insert of FIG. 1; and

FIG. 3 is a cross section through the belt showing the combined insert and belt.

DETAILED DESCRIPTION

As seen in FIG. 1 an electrical or electronic insert 1, is intended for use in a safety belt shown in FIG. 2.

The insert 1 has a flexible support strip 3 on or to which three sensors 4, 5 and 6, which can be microphones for example, are fixed. In the illustrated embodiment shown, the spacing between the middle sensor 5 and the upper sensor 4 and between the middle sensor 5 and the lower sensor 6 are the same. The flexible strip 3 at its ends with respective anchor regions 7 and 8.

The safety belt 2 as shown in FIG. 2 is formed midway between its longitudinal outer edges with a passage 9 extending in a longitudinal direction 10 of the belt 2. The passage 9 is designed so that a lower face 20 of the safety belt 2 is not affected by the presence of the passage 9, that is the passage 9 is not visible on the lower face 20. The passage 9 therefore is only visible on the front or upper side 11 of the safety belt 2.

A longitudinal portion 12 of the passage 9 of the safety belt 2 is intended to receive the insert 1 or its flexible strip 3. In this region 12 the passage 9 is provided with regions 13, 14 and 15 through which sound can pass, which are designed in the form of woven regions through which sound can pass of the webbing covering the passage 9 on the front or upper side 11 of the safety belt 2.

The regions 13, 14, 15 through which sound can pass are arranged so that they align with the sensors 4, 5, 6 of the insert 1 when the insert 1 is slid into the passage 9 of the safety belt 2 and is fixed in its installation position by means of the anchor regions 7, 8.

An insertion tool 17 by means of which the insert 1 or its flexible strip 3 can be slid into the passage 9 through a opening on the face 12 and that is shown purely schematically in FIG. 1, is used to slide the insert 1 or its flexible strip 3 into the passage 9 of the safety belt 2. The insert 1 or its flexible strip 3 is slid into the passage 9 until it is aligned in the longitudinal portion 12 with its sensors 4, 5, 6 each juxtaposed under a respective one of the regions 13, 14, 15 through which sound can pass. In this position of the flexible strip 3, it is fixed inside the passage 9 by carrying out laser welding at its anchor regions 7, 8.

A cable 18 extending from the insert 1 can be connected to an alarm 19 or the like. Thus when the alarm 19 detects something in the vital signs indicating the person wearing the belt 2 is dozing or falling asleep, it can sound an arm or shake the seat to arouse the person.

The safety belt 2 described above equipped with the insert 1 can be manufactured in a conventional weaving process or the like. The insert 1 is manufactured separately and then easily fixed in its installation position within or on the safety belt 2.

I claim:

1. In combination:
  a motor-vehicle safety belt formed as a flexible longitudinally extending band and formed with a longitudinally extending and laterally substantially closed passage, the belt having an upper face extending continuously over the passage and a lower face extending continuously and smoothly underneath the passage such that the passage is not visible on the lower face;
  an insert fittable into the passage and comprised of a flexible and elongated support strip and at least one electrical or electronic element usable by a motor-vehicle passenger employing the belt secured to the strip, the upper face being formed at the element with a region through which sound can pass more readily than it can otherwise pass through the belt; and
  anchor regions on the strip adapted to be welded to the belt for securing the strip to the belt.

2. The combination defined in claim 1, wherein the passage extends longitudinally generally centrally between longitudinal outer edges of the belt.

3. The combination defined in claim 1, wherein the belt carries a plurality of the electrical or electronic elements spaced longitudinally from one another and secured to the support strip.

4. The combination defined in claim 1, wherein the anchor regions are caps of a material that is weldable to a material the belt is made from.

5. The combination defined in claim 1, wherein the anchor regions are caps of a material that can be adhesively bonded to the belt.

6. The combination defined in claim 1, further comprising an electrical cable extending along the passage to an end of the belt and connected to the electrical or electronic device.

7. The combination defined in claim 6 wherein the cable is flexible and elastic.

8. The combination defined in claim 1, wherein the electrical or electronic element is a microphone.

9. The combination defined in claim 1, wherein the electric or electronic element is capable of detecting a vital sign of the user of the belt.

10. The combination defined in claim 9, further comprising:
- warning means connected to the electric or electronic element for arousing the user of the belt on detection of a vital sign characteristic of dozing or sleeping.

* * * * *